United States Patent
Wu et al.

(10) Patent No.: US 8,214,840 B2
(45) Date of Patent: *Jul. 3, 2012

(54) OPTIMIZATION WITH UNKNOWN OBJECTIVE FUNCTION

(75) Inventors: Chai Wah Wu, Poughquag, NY (US); Yixin Diao, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 1021 days.

This patent is subject to a terminal disclaimer.

(21) Appl. No.: 12/173,947

(22) Filed: Jul. 16, 2008

(65) Prior Publication Data

US 2008/0276245 A1   Nov. 6, 2008

(51) Int. Cl.
 *G06F 9/46* (2006.01)
 *G06F 15/18* (2006.01)
(52) U.S. Cl. .......................... 718/104; 706/19
(58) Field of Classification Search .................. 718/104; 706/19
See application file for complete search history.

(56) References Cited

PUBLICATIONS

Kurose et al. "A Microeconomic Approach to Optimal Resource Allocation in Distributed Computer Systems", IEEE Transactions on Computers, vol. 38, No. 5, May 1989.*
Lawrence, Jeannette. Introduction to Neural Networks, California Scientific Software, 3rd Edition, 1991.*

* cited by examiner

*Primary Examiner* — Meng An
*Assistant Examiner* — Brian Chew
(74) *Attorney, Agent, or Firm* — Whitham, Curtis, Christofferson & Cook, P.C.; Daniel P. Morris

(57) ABSTRACT

Nonlinear optimization is applied to resource allocation, as for example, buffer pool optimization in computer database software where only the marginal utility is known. The method for allocating resources comprises the steps of starting from an initial allocation, calculating the marginal utility of the allocation, calculating the constraint functions of the allocation, and applying this information to obtain a next allocation and repeating these steps until a stopping criteria is satisfied, in which case a locally optimal allocation is returned.

4 Claims, 4 Drawing Sheets

– 1 –

OPTIMIZATION WITH UNKNOWN OBJECTIVE FUNCTION

This application is a continuation of U.S. patent application Ser. No. 10/669,722, filed Sep. 25, 2003, and which is incorporated herein by reference.

BACKGROUND OF THE INVENTION

1. Field of the Invention

The present invention generally relates to the field of nonlinear optimization and, more particularly, to resource allocation, as for example, buffer pool optimization in computer database software where only the marginal utility is known.

2. Background Description

Conventionally, resource allocation maximizing some utility function using nonlinear optimization requires knowledge of the utility as a function of the allocated resources. For example, the resources could be the memory allocated to a series of computer processors and the utility is the aggregate performance of these processors or the reduction in power consumption of these processors. In prior art methods for solving this problem, knowledge of this utility function is required. Almost all prior art algorithms for solving this problem can be classified into one of the following three classes:

1. Only the utility function $f$ is known, i.e., at each point, there is a procedure to evaluated $f(x)$. Examples of such algorithms include the simplex method and genetic algorithms.
2. Only the utility function $f$ and the gradient $\nabla f$ are known. Examples include steepest descent, conjugate gradient and Quasi-Newton methods.
3. The utility function $f$, its gradient $\nabla f$ and its Hessian $\nabla^2 f$ are known. Examples include Newton's method.

Thus, in prior art algorithms, knowledge of the utility function is required in order to solve the optimization problem. In some applications, knowledge of this utility function is absent, and prior art iterative optimization algorithms cannot be used to solve this problem.

As a specific example, buffer pool optimization in International Business Machines' (IBM's) DB2 computer database software is a problem where only the gradient of the utility function is known, i.e., at each point we know the benefit in terms of saved disk access time due to allocating more memory, but the utility, which in this case is the total saved disk access time due to current buffer pool setting, is unknown.

Therefore, there is a need in the art for a method to allocate resources maximizing such utility using algorithms which do not need to know the utility as a function of the resources.

SUMMARY OF THE INVENTION

It is therefore an object of the present invention to provide a way to maximize the utility of an allocation of resources without the need to know the utility as a function of the allocated resources.

In a general form, the problem can be formulated mathematically as follows. The object is to maximize the utility function $f(x)$ subject to constraints on the vector x. Each vector x denotes a particular allocation of resources and the constraints generally describe properties of the resources which must be satisfied, for instance, the total number of resources must be less than a certain number, etc.

The present invention provides a method for allocating resources by specifying an allocation x which maximizes $f$ (x) while satisfying the constraints on x where the steps of the method do not require knowledge of $f$.

Sometimes the goal is to minimize some function $f$ in which case we refer to $f$ as a cost function rather than a utility function. In the nonlinear programming literature, $f$ is usually called an objective function.

In one embodiment of the present invention, a method for allocating resources (i.e., determining x) may comprise the steps of starting from an initial allocation, calculating the marginal utility of said allocation, calculating the constraint functions of said allocation, and applying this information to obtain a next allocation and these steps are repeated until a stopping criteria is satisfied, in which case a locally optimal allocation is returned.

According to the invention, we provide algorithms which are used to solve the above nonlinear programming problem where 1. only the gradient $\nabla f$ is known, or
2. only the gradient $\nabla f$ and the Hessian $\nabla^2 f$ are known.

i.e., there is no procedure to evaluate the objective function $f$. These two cases are optimization problems which have not been considered before. A simple example of this problem is when $f=\int g$, where g is an explicit function whose integral cannot be written in closed form.

Our algorithms are derived from prior art optimization algorithms, but modified to not need evaluation of the objective functions.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
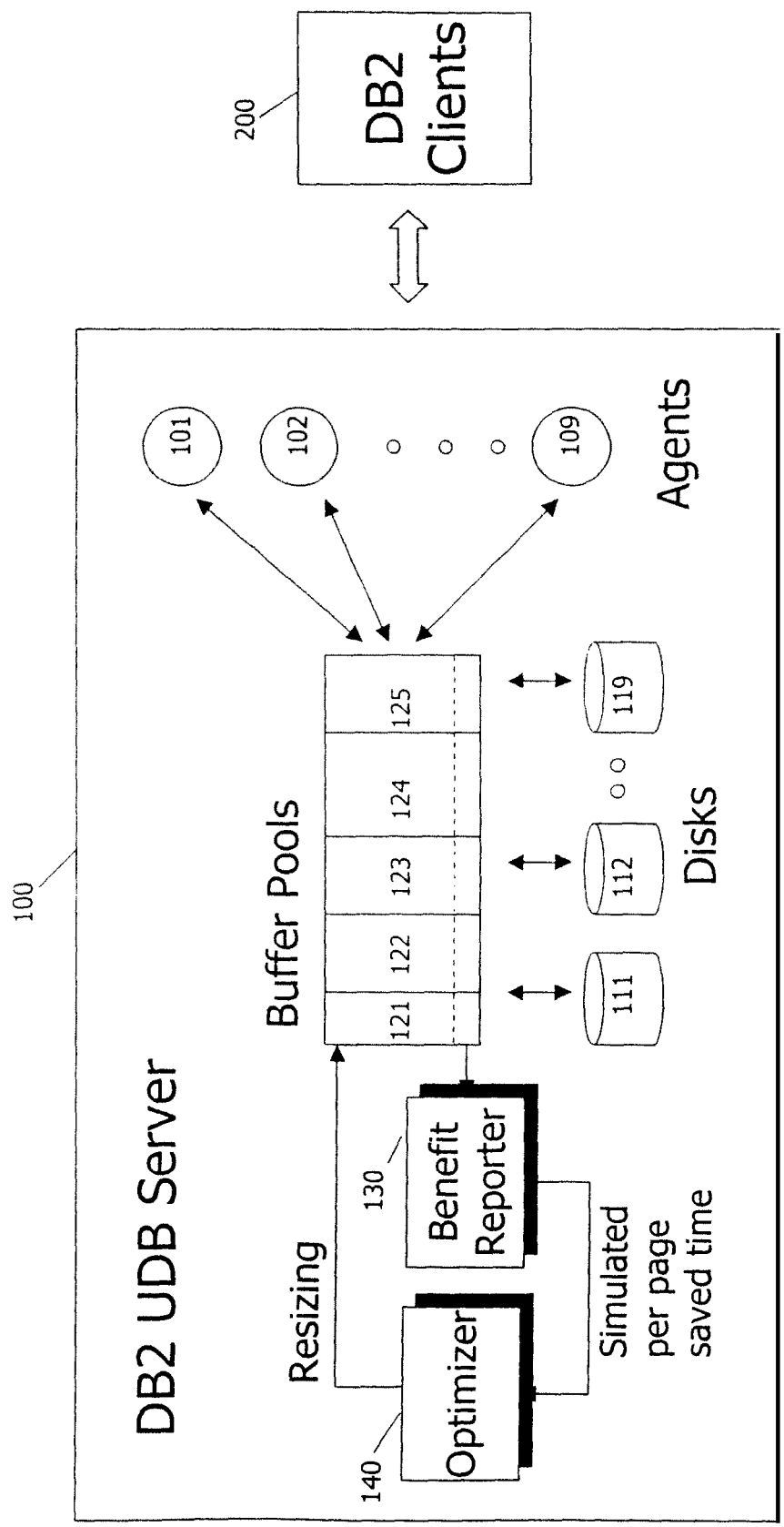
FIG. 1 is a block diagram which illustrates a data processing system in which a preferred embodiment of the invention is implemented.

Referring now to the drawings, and more particularly to FIG. 1, there is shown in block diagram form a data processing system in which the invention has been implemented. This system comprises a DB2 Universal Database (UDB) server 100 which is a relational database management system. The UDB server 100 serves multiple DB2 clients 200 through DB2 agents 101, 102, ..., 109. The DB2 server has a plurality of disks 111, 112, ..., 119. Part of the data from the disks are stored in the memory, e.g., buffer pools 121 to 125, for fast access. DB2 performance is largely impacted by memory configuration. A proper configuration can put the right data (e.g., table, index) in the memory and thus reduce costly disk I/O time. The objective is to maximize the total saved disk time from all memory components (e.g., buffer pools). However, the total saved disk time cannot be easily measured. Instead, a benefit reporter 130 can be built to report the gradient information of the total saved disk time, so-called "benefit". The benefit reporter 130 simulates a certain amount of memory increase (shown as simPages in FIG. 2) and computes the possible saved disk time (shown as savedTime in FIG. 2) due to this increase. The ratio of saved disk access time over the memory increase is reported as the "benefit" or the "benefit per page". (Refer to FIG. 2 for more details on the difference between saved disk time and benefit.) The optimizer 140 operates based on this benefit information for resizing buffer pools to achieve optimal performance.

Figure 2:
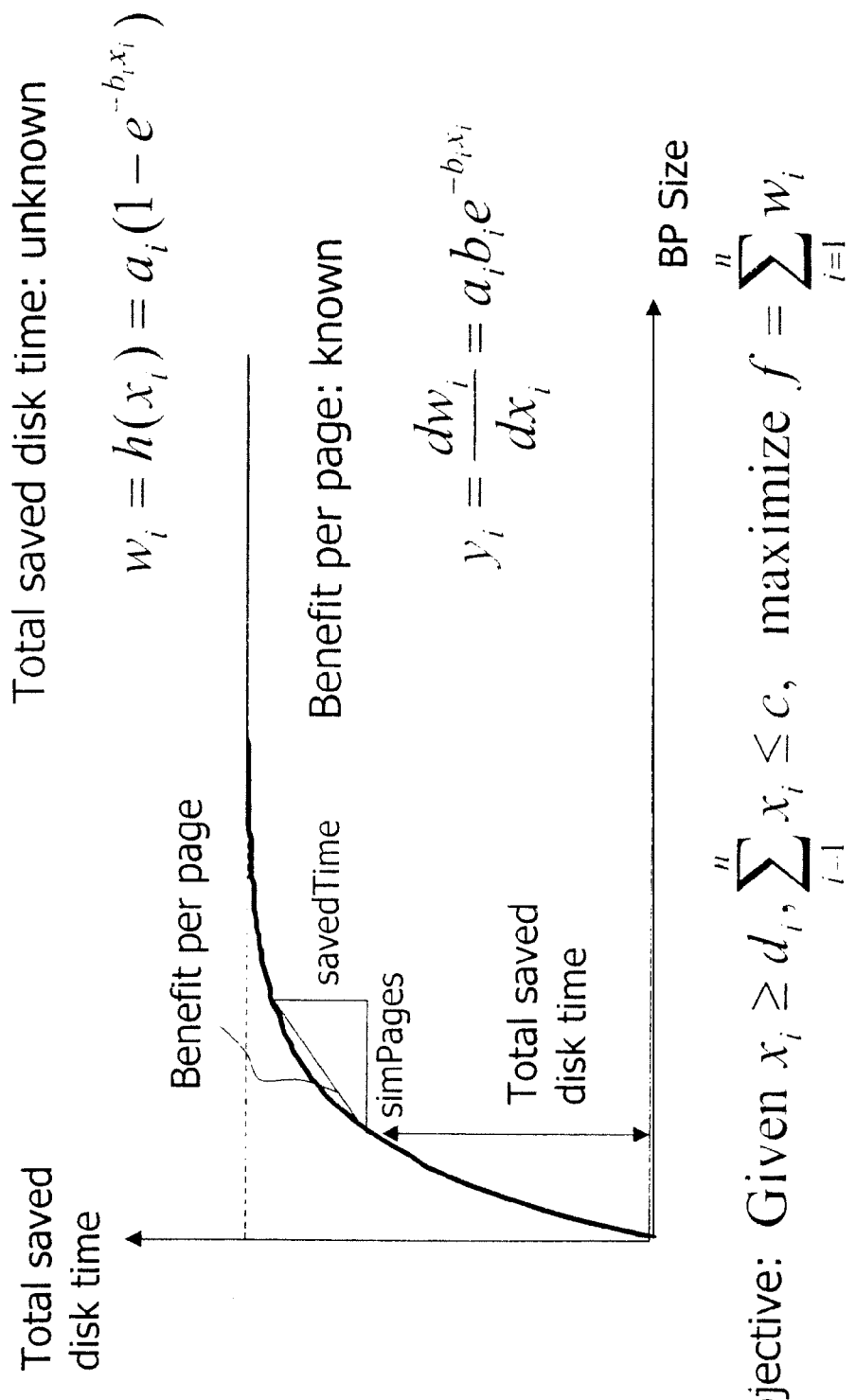
FIG. 2 is a graph illustrating the buffer pool optimization achieved by the invention for an example utility function and example constraint functions.

FIG. 2 is a graph showing the total saved disk time as a function of buffer pool size. The optimizer operates based on the "benefit" data—simulated saved disk access time per simulated-increasing memory page per memory component. The Karush-Kuhn-Tucker optimaltality condition for this problem specifies that the benefits are equal for all memory components which are not at the bounds $d_i$ at the point where the total saved disk time from all memory components is maximal and thus a possible tuning objective is to equalize the benefits from all memory components when possible. The plot in FIG. 2 illustrates an example of the nonlinear relationship between saved disk time and memory size for the buffer pool. The saved disk time is increasing when the memory size is increasing, and becomes saturated when the memory is large enough to hold the whole table(s). This nonlinear relationship can be modeled by an exponential function. The tuning objective is to maximize the total saved disk time from all memory components, given the constraint that the total memory is finite. However, the saved disk time is difficult to measure because once the data is in the memory, the corresponding disk access time does not exist. Instead, a gradient reporter can be built to simulate increasing memory pages and to estimate the corresponding simulated saved disk time. This results in the approximated gradient—so called "benefitPer-Page".

The present invention comprises a method, computer program product and system for resource allocation when the utility function is unknown and the marginal utility is known. The marginal utility with respect to a particular resource is the additional incremental utility obtained by incremental increase of that resource and is equivalent to the gradient of the utility functions(x). Examples of the utility are total time saved, number of transactions processed, power consumption saved, processors utilization, memory utilization, etc.

All prior art iterative nonlinear optimization algorithms assumes knowledge of the utility functions, and if available, the gradient $\nabla f$, and the Hessian $\nabla^2 f$:

In general, the problem is given as:

$$\max_x f(x) \text{ subject to constraints}$$

By replacing $f$ with $-f$, the problem is written as a minimization problem which is the standard form in nonlinear programming:

$$\min_x f(x) \text{ subject to constraints}$$

In this case we will call $f$ the cost function rather than the utility function. Some examples of cost are total disk I/O (input/output) time, power consumption and overall system response time. The present invention provides a method for solving the minimization problem above without the need to evaluated This is useful in applications where evaluating $f$ is impossible, very expensive, time-consuming and/or inaccurate. An example of such $f$ is when $f=°g$, where g is a function whose integral cannot be written in closed form, e.g., $e^{-x_2}$.

Good text on nonlinear programming and numerical optimization include: *Practical Optimization* by P. Gill et al., Academic Press, 1981, *Practical Methods of Optimization* by R. Fletcher, Wiley & Sons, 1987, and *Numerical Optimization* by J. Nocedal and S. Wright, Springer, 1999.

We employ modification of line search based algorithms such as steepest descent, conjugate gradient, quasi-Newton or Newton's method. In these line search based algorithms, almost all components of the algorithm do not require evaluation of $f$. The stopping criteria based on first or second order optimaltality conditions also do not require evaluation of $f$. The only place where evaluation off is required is in the scalar line search component where a one-dimensional optimization is performed along a particular direction p. Our invention is to use a scalar line search method that does not require evaluation of $f$. For instance, in prior art backtracking line search along a search direction p, the step size $\alpha$ is decreased until the sufficient decrease or Armijo condition is satisfied:

$$f(x+\alpha p) \leq f(x) + c_1 \alpha \nabla f(x)^T p$$

where $A^T$ denotes the transpose of the matrix (or vector) A. This requires evaluation of the function $f$. The disclosed invention uses a backtracking line search that decreases the step $\alpha$ until the following condition is satisfied:

$$(\nabla f(x+\alpha p) - c_1 \nabla f(x))^T p \leq 0 \quad (1)$$

This results in a line search which uses only gradient information. Using this line search with the rest of the components in a prior art line search type nonlinear programming method results in a nonlinear programming method which uses only gradient information, and if available, Hessian information, to minimize $f$ and does not require evaluation of $f$ itself.

Figure 3:
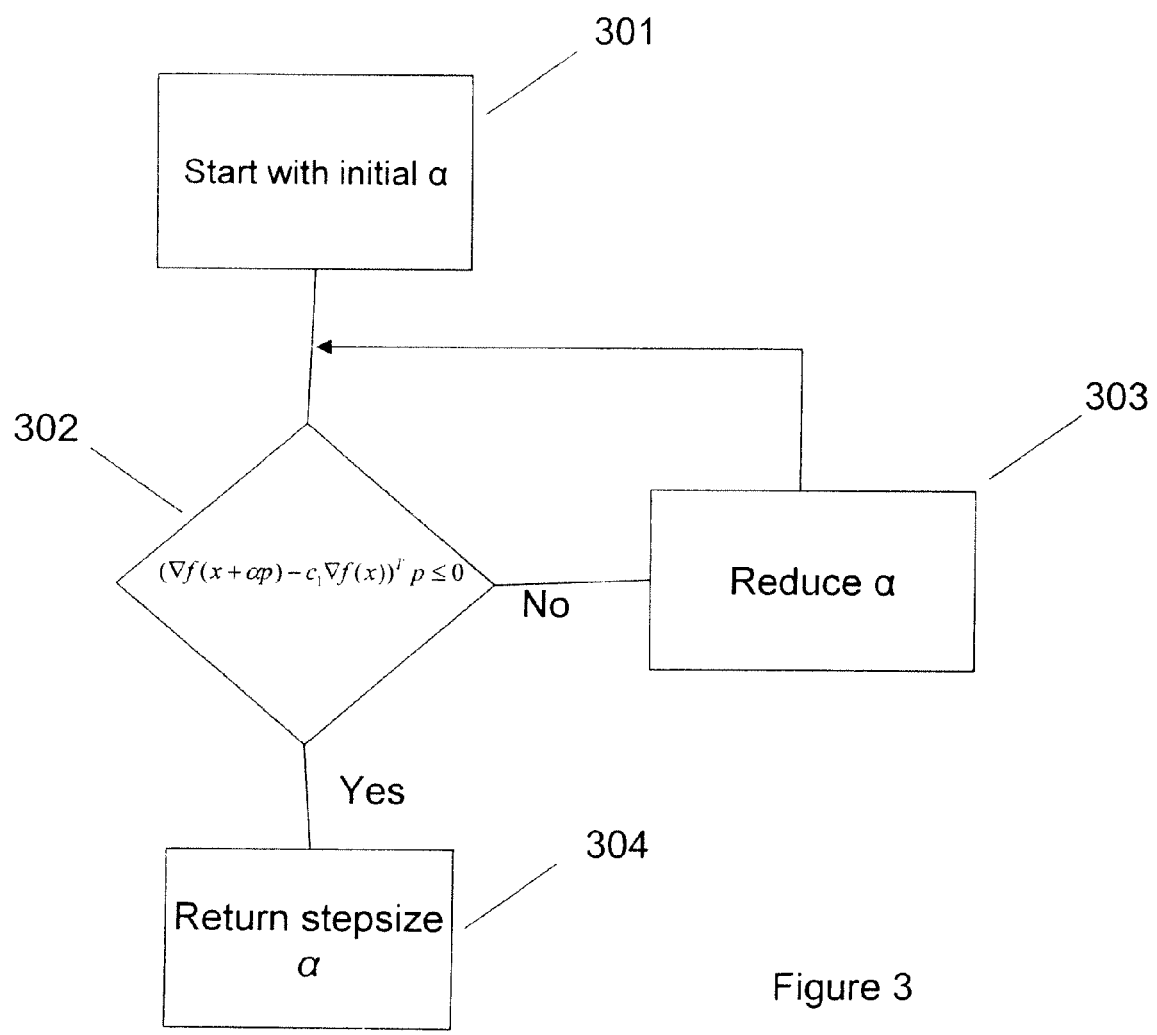
FIG. 3 is a flow diagram illustrating the scalar line search implemented in a preferred embodiment.

This is illustrated in FIG. 3 which is a flow diagram of the scalar line search method in a preferred embodiment of the invention. The process begins with an initial value of $\alpha$ at input block 301. A determination is made in decision block 302 as to whether Equation (1) is satisfied. If not, the value of $\alpha$ is reduced in function block 303, and then a return is made to decision block 302. The reduction of $\alpha$ in function block 303 can be done by multiplying $\alpha$ by a constant $c_2<1$. Some typical values for $c_1$ and $c_2$ are $c_1=0.0001$, $c_2=0.7$. When Equation (1) is satisfied, as determined in decision block 302, the step size $\alpha$ is returned in output block 304. The step size $\alpha$ is then used by the optimization algorithm to compute the next solution point $x+\alpha p$. Note that when $f$ is convex, the condition in Equation (1) implies the Armijo condition and thus in this case convergence properties of prior art methods using the Armijo condition remain true for the disclosed method.

In a preferred embodiment, the resources are a series of memory buffers in a computing system running the database software DB2 and the goal is to minimize access time by allocating memory to these buffers appropriately. This is illustrated in FIG. 1. The allocation is given by a vector $x=(x_1, \ldots, x_n)$ and the problem is to maximize $f(x)$ subject to the constraint $$\sum_i x_i \leq c \text{ and } x_i \geq d_i.$$

The utility function $f(x)$ is the total disk time avoided by using the allocation vector x, whereas the partial derivative $$\frac{\partial f}{\partial x_i}$$

is the time saved by allocation more resources to $x_i$. This is illustrated in FIG. 2.

The gradient $\nabla f$ consists of the partial derivatives of $f$, and corresponds to the benefit in access time saved due to increased memory buffer allocation. The system configuration is such that $\nabla f$ is readily available, whereas $f$ is not available (or requires too much effort to compute accurately).

By the Karush-Kuhn-Tucker optimaltality condition, at the optimal point $x^*=(x_1^*, \ldots, x_n^*)$ where $f$ is maximized, the gradient $\nabla f$ satisfies $$\nabla f(x^*)_i = \lambda, \text{ if } x_i^* > d_i$$

$$\nabla f(x^*)_i \leq \lambda, \text{ if } x_i^* = d_i$$

for some real number $\lambda$. To solve this problem where the inequality constraints are linear, which is a special case of the general problem, an active set line search algorithm can be used.

Figure 4:
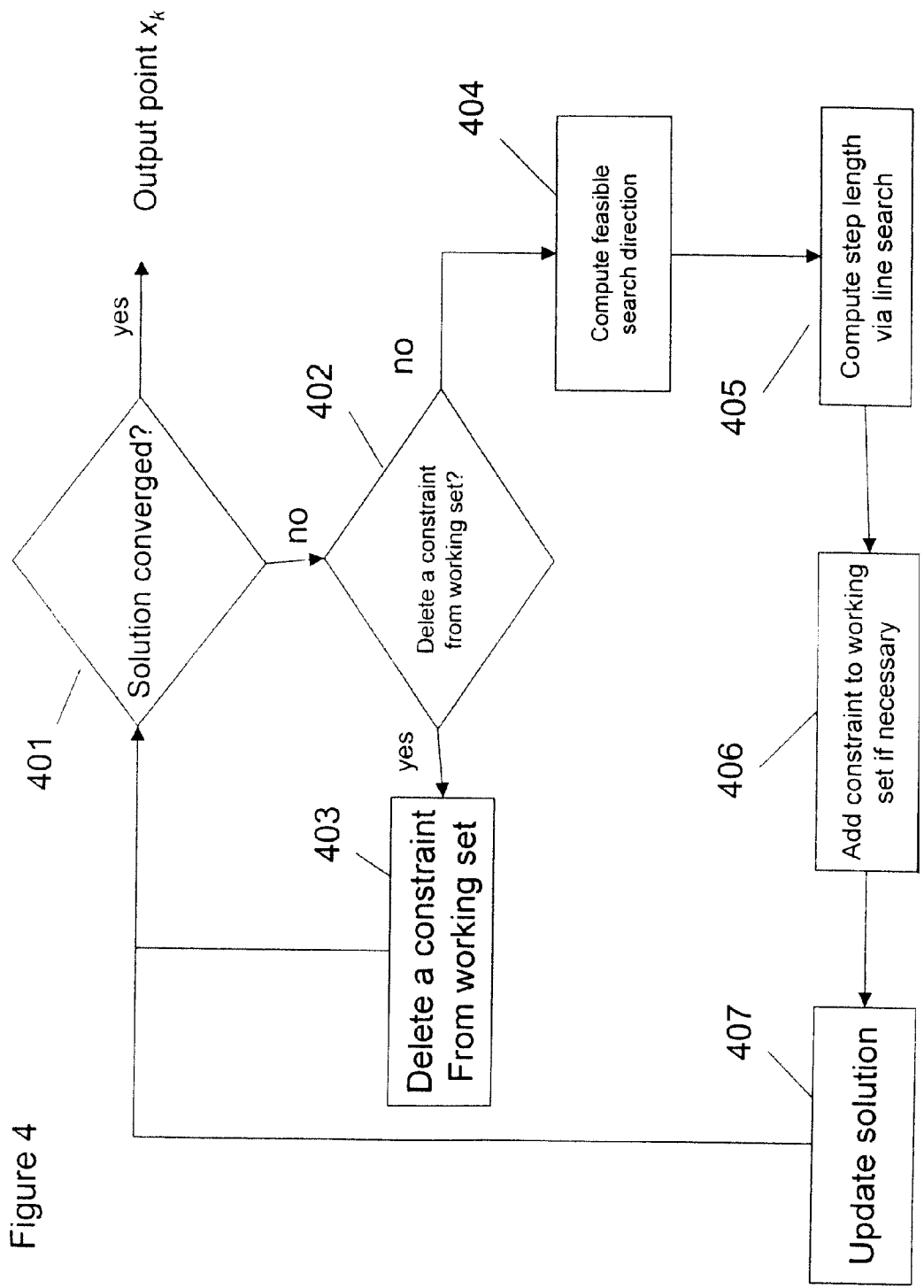
FIG. 4 is a flow diagram illustrating the method as implemented in a preferred embodiment.

A flowchart of such an algorithm is shown in FIG. 4. A determination is made in decision block 401 as to whether the solution has converged. If not, a determination is next made in decision block 402 as to whether to delete a constraint from the working set. If so, a constraint is deleted from the working set in function block 403 and a return is made to decision block 401; otherwise, a feasible search direction is computed in function block 404. Then, in function block 405 a step length is computed via a line search. If necessary, a constraint is added to the working set in function block 406, and the solution is updated in function block 407 before a return is made to decision block 401. An output is provided when the solution has converged. More details can be found in Section 5.2.1 in the text by Gill et al., ibid. In the preferred embodiment, the modified backtracking line search described above is used to execute block 405 in FIG. 4. Note that we need to replace $f$ with $-f$ in Equation (1) as Equation (1) is given for minimizing $f$, whereas in the case of the buffer pool optimization, the goal is to maximize $f$. Such a change is common and known by those skilled in the art.

Most line search based nonlinear optimization algorithms can be modified in the same manner by those skilled in the art to obtain a corresponding algorithm that does not require evaluation of $f$. For example, for more general constraints, line search based methods such as penalty function methods, augmented Lagrangian methods, and sequential quadratic programming methods can be used, where the scalar line search component in these methods is replaced by the modified line search described above. Furthermore, since the utility function $f$ in FIG. 2 is separable, techniques for exploiting separability, and more generally partial separability and group partial separability (see Chapter 9 of Nocedal and Wright, ibid.) can be used.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. An apparatus for resource allocation comprising a processor configured to provide:
   a step size determination engine;
   an optimization module for evaluating step size effectiveness with information on marginal utility but without evaluation of utility;
   a constraint module for reducing the step size if necessary based on said marginal utility; and
   an interface module for deploying an effective step size for utility optimization.

2. The apparatus of claim 1, wherein allocated resources are database memory components.

3. The apparatus of claim 1, wherein allocated resources are computer memory resources.

4. The apparatus of claim 1, wherein allocated resources are computer system resources and said resources are allocated to achieve optimal service level objectives.

\* \* \* \* \*